US005872981A

United States Patent [19]
Waddington et al.

[11] Patent Number: 5,872,981
[45] Date of Patent: Feb. 16, 1999

[54] METHOD FOR MANAGING TERMINATION OF A LOCK-HOLDING PROCESS USING A WAITING LOCK

[75] Inventors: William H. Waddington, Foster City; Leng Leng Tan, Sunnyvale; Patricia Grewell, San Mateo, all of Calif.

[73] Assignee: Oracle Corporation, Redwood Shores, Calif.

[21] Appl. No.: 865,885

[22] Filed: May 30, 1997

[51] Int. Cl.$^6$ .............................. G06F 13/00; G06F 13/14
[52] U.S. Cl. ................................. 395/726; 707/8
[58] Field of Search ..................... 395/726, 670, 395/674, 288; 707/8; 711/152, 100

[56] References Cited

U.S. PATENT DOCUMENTS

| | | | |
|---|---|---|---|
| 4,574,350 | 3/1986 | Starr | 395/726 |
| 4,769,772 | 9/1988 | Dwyer | 364/300 |
| 4,829,427 | 5/1989 | Green | 364/300 |
| 4,965,719 | 10/1990 | Shoens et al. | 711/100 |
| 5,091,852 | 2/1992 | Tsuchida et al. | 395/600 |
| 5,325,525 | 6/1994 | Shan et al. | 395/650 |
| 5,339,427 | 8/1994 | Elko et al. | 395/673 |
| 5,423,044 | 6/1995 | Sutton et al. | 395/726 |
| 5,729,749 | 3/1998 | Ito | 395/726 |
| 5,761,659 | 6/1998 | Bertoni | 707/8 |

OTHER PUBLICATIONS

"Optimization of Parallel Query Execution Plans in XPRS", Hong, et al., Computer Science Division, EECS Department, UC Berkeley, 1991, pp. 218–225.
"A Performance Analysis of the Gamma Database Machine", DeWitt, et al., Computer Sciences Department, University of Wisconsin, 1988, pp. 350–360.
"The Design of XPRS", Michael Stonebraker, et al., EECS Deparment UC Berkeley, 1988, pp. 318–330.
"Data Placement in Bubba", George Copeland, et al., MCC, 1988, pp. 99–108.
"A Benchmark of NonStop SQL on the Debit Credit Transactions", The Tandem Performance Group, 1988, pp. 337–341.
"A Benchmark of NonStop SQL Release 2 Demonstrating Near–Linear Speedup and Scaleup on Large Databases", Susan Englert, et al., Technical Report 89.4, May 1989, pp. 1–23.
"An Analysis of Three Transaction Processing Architectures" Anupam Bhide, Computer Science Division, UC Berkeley, 1988, pp. 339–350.
"Encapsulation of Parallelism in the Volcano Query Processing System", Goetz Graefe, Computer Science, University of Colorado, Mar. 1990, pp. 102–111.

*Primary Examiner*—Gopal C. Ray
*Attorney, Agent, or Firm*—Blakely, Sokoloff, Taylor & Zafman LLP

[57] ABSTRACT

A method for managing termination of a process that holds a resource lock on behalf of another process is described. A first process acquires a first lock to a resource on behalf of a second process to exclude other processes from accessing the resource. The second process then acquires a wait lock to the resource. Later, when a third process acquires the first lock to the resource, the third process determines whether the first process terminated without releasing the lock. If the first process did terminate without releasing the lock, the third process attempts to acquire the wait lock. In attempting to acquire the wait lock, execution of the third process is suspended until the second process releases the wait lock. Consequently, acquisition of the wait lock by the third process prevents concurrent access to the resource by the third process and the second process.

20 Claims, 13 Drawing Sheets

METHOD FOR MANAGING TERMINATION OF A LOCK-HOLDING PROCESS USING A WAITING LOCK

TITLE OF THE INVENTION

The title of the invention is "Method for Managing Termination of a Lock-Holding Process Using a Waiting Lock".

BACKGROUND OF THE INVENTION (1) Field of the Invention

The present invention relates to the field of computer processing. More specifically, the present invention relates to a method for preventing resource conflicts in a multiprocessing computer system.

(2) Art Background

In distributed data processing systems, data objects such as database tables, indexes and other data structures are often shared by multiple processes. If a data object is accessed by two or more processes during the same time interval, problems may arise depending on the nature of the access. For example, if one process attempts to write a data object while another process is reading the data object, an inconsistent set of data may be obtained by the reading process. Similarly, if two processes try to write the same data object during the same time interval, data corruption may result. In both cases, the accessing processes are said to have a "resource conflict", the resource being the shared data object.

Resource Locking

Resource locking is one technique used to avoid resource conflicts in multiprocessed applications. Resource locking is a protocol in which processes signal their use of a resource by "acquiring a lock" on the resource from a lock manager. These resources may include data objects, processes, memory regions, registers, I/O devices, etc.. Before using a resource, a requesting process checks to see if the corresponding lock is available. If so, the requesting process acquires the lock and uses the resource, releasing the lock when finished. If the lock is not available, the requesting process waits for the lock to be released by the prior acquiring process before using the resource.

In most resource locking systems, multiple processes may concurrently lock a resource so long as their respective uses of the resource are compatible. Generally, a process indicates the nature of its intended use of a resource by acquiring a lock to the resource in a particular mode. For example, a process that needs to write to a resource would typically acquire the corresponding lock in an exclusive mode to indicate that no other process should have read or write access to the resource. Once a resource is locked by an exclusive lock, requests to obtain the lock for read or write purposes are denied. On the other hand, a process that merely needs to read the resource could acquire the lock in a non-exclusive mode to indicate that other processes may concurrently read the resource. Since the locking mode is indicative of the use of the resource, it is common to refer to locks themselves as being compatible or incompatible with each other. For example, exclusive locks are incompatible with any other resource access lock, while non-exclusive locks are generally compatible with other non-exclusive locks.

One undesirable situation that can arise in a resource locking scheme is a deadlock. A deadlock occurs when a first process attempts to acquire a lock on a resource that is already incompatibly locked by a second process, and the second process likewise attempts to acquire a lock on a resource that is already incompatibly locked by the first process. Since neither process is able to release the lock sought by the other until acquiring the lock held by the other, neither process can proceed. Deadlocks are typically resolved by terminating one of the deadlocked processes to allow the other process to continue. As discussed below in the context of database management, depending on the amount of processing accomplished by a deadlocked process prior to its termination, considerable time and processing effort may be wasted as a result of the deadlock.

Resource Locking in a Database Management System

One application for resource locking is database management. In a database, data is typically stored in tables where it is organized into rows (entries) and columns (categories). Before a process operates on a particular database table or a particular set of entries in the database table, it is often desirable for the process to lock the table or a particular set of entries therein to prevent other processes from performing incompatible operations on the table. Then, after the process has completed operating on the database table, the lock is released.

One type of database table that presents particularly challenging locking issues is called a "partitioned" table. A partitioned table is a table that has been decomposed into smaller, more manageable pieces called partitions. In some cases a partitioned table includes entries that have been distributed among two or more computers of a computer network. When a request to perform an operation on a partitioned table is received, a process called a "coordinator process" is invoked to identify the different table partitions to be operated on and to initiate a number of worker processes to carry out the necessary operations. From a resource locking standpoint, the challenge is for the worker processes to lock different table partitions without deadlocking with one another or with other processes. This is made more or less difficult by the manner in which the coordinator process allocates work to the worker processes.

A coordinator process may allocate work (requests to operate on partitions) to worker processes according to one of two work allocation models: static and dynamic. In the static work allocation model, the coordinator process assigns each of the necessary partition operations to the worker processes before the workers begin processing. The advantage of static work allocation is that the coordinator process can determine at the outset the resources needed by each worker process to accomplish its respective work assignment. This enables the coordinator process to allocate work in such a way as to avoid deadlocks between worker processes.

A major disadvantage of static work allocation, however, is that optimum parallel processing by workers is often not achieved. This is because workers do not necessarily complete their assigned work at the same rate (due to a number of factors, including difference in processor speed, network connection delay, unequal work load, etc.), so that one worker process may finish significantly faster than other worker processes. Since all of the work has already been allocated by the coordinator process, however, the first-finished worker process will remain idle (or terminate) when it potentially could have been assigned work not yet completed by another worker process. Consequently, in the static work allocation model, parallel processing is reduced, increasing the time required to complete the requested database operation.

In the dynamic work allocation model, the coordinator process allocates less than all of the work to an initial set of worker processes. Then, when one worker process of the initial set of worker processes finishes its assigned work, the coordinator process allocates more work to that worker. The advantage of dynamic work allocation is that a set of N worker processes are made to operate concurrently until the overall database operation is complete or nearly complete. This is in contrast to the static work allocation model in which N worker processes may operate concurrently for only a small portion of the time required to complete the overall operation.

One disadvantage of dynamic work allocation is that, because it is uncertain at the outset what resources may need to be locked by any given worker process, deadlocks become much more likely. Worse, since the initially scheduled work will tend to be free from deadlock, any deadlocks which arise will likely occur after substantial work has already been performed. Since, in a database management system, terminating a deadlocked process usually requires all processing performed up to the termination point to be undone ("rolled back"), late detected deadlocks often require substantial roll back before the overall operation can begin again. This can result in many hours of lost processing and considerable expense.

What is needed is a method for allowing work to be dynamically allocated to worker processes, but with early detection of deadlock conditions. This way, the efficiency obtained by parallel processing in worker processes could be maximized and any deadlock conditions could be detected before significant processing has taken place. This advantage and others are achieved by the present invention.

SUMMARY OF THE INVENTION

In the present invention work to be performed on a partitioned data object is dynamically allocated to slave processes with early detection of deadlock conditions. A coordinator process first identifies resources that need to be locked by the plurality of slave processes during execution of a work plan, the work plan indicating operations to be performed on a plurality of partitions of the partitioned object. The coordinator process then attempts to acquire locks to the resources on behalf of the plurality of slave processes before execution of the work plan is begun. Finally, deadlock conditions between the coordinator process and another foreground process are detected based on the locks sought to be acquired by the coordinator process.

If the coordinator process prematurely terminates while holding a lock on behalf of a slave process, certain resource conflicts become possible. In one embodiment of the present invention, such resource conflicts are avoided through the use of a lock validation attribute and an additional lock referred to as a "wait lock". When a coordinator process acquires a resource lock on behalf of a slave process, the coordinator process assigns an identifying value to the lock validation attribute. The slave process acquires the resource lock in null-mode to prevent the validation attribute from being cleared upon death of the coordinator process. The slave process also acquires an exclusive-mode wait lock on the resource to be operated upon. Finally, before operating on the resource, the slave process confirms that the resource lock validation attribute identifies the coordinator process.

A subsequent acquirer of the resource lock checks the validation attribute. If the validation attribute is non-null, it is assumed to identify a prematurely terminated coordinator process. In that case, the subsequent acquirer of the resource lock attempts to acquire the resource wait lock in shared mode. If a remnant slave process continues to operate on the resource previously locked by the now dead coordinator process, the remnant slave process will hold the resource wait lock in exclusive-mode, thereby preventing conflicting access by the subsequent acquirer of the resource lock. Thus, the wait lock serves to prevent resource conflict by serializing access to the resource by the remnant slave process and the subsequent acquirer of the resource lock.

BRIEF DESCRIPTION OF THE DRAWINGS

The features and advantages of the present invention will be more fully understood by reference to the accompanying drawings, in which.

DETAILED DESCRIPTION OF THE INVENTION

A method and apparatus for managing termination of a lock-holding process using a waiting lock are described below. Although numerous specific details are set forth in order to provide a thorough understanding of the present invention, it will be apparent to one skilled in the art that the present invention may be practiced without such specific details. For example, while managing access to partitions of a partitioned data object is described below, access to other data entities may be managed by the present invention. Such entities may include blocks or ranges of rows within a database table, files, memory regions and any other data entity that may potentially be shared by more than one process.

Partitioned Data Object

Figure 1:
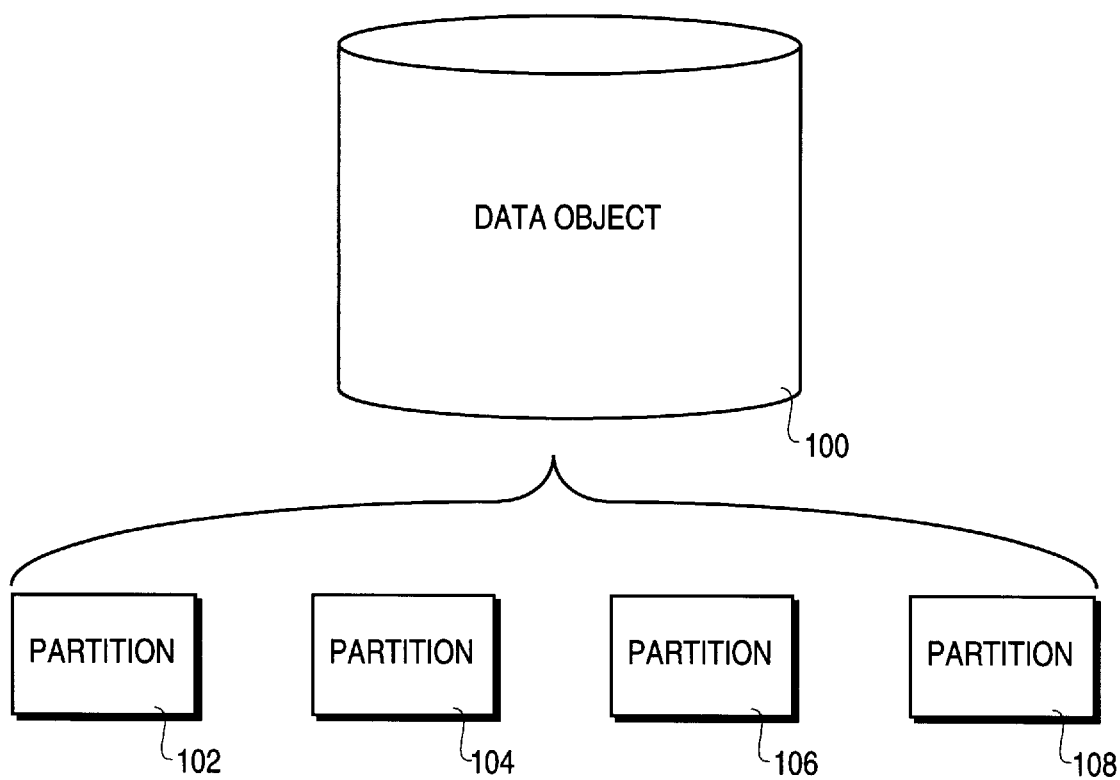
FIG. 1 illustrates a partitioned data object.

FIG. 1 depicts a data object 100 that can be accessed concurrently by multiple processes. In order to prevent resource conflicts between the accessing processes, data object 100 may be locked in a number of different modes. For example, a process seeking to write to data object 100 would lock data object 100 in exclusive mode to prevent concurrent access by other processes. A process seeking to read data object 100 would lock data object 100 in a non-exclusive mode referred to herein as a "shared" mode, to allow concurrent, compatible access by other processes. In another possible locking mode, called "sub-exclusive mode", data object 100 is effectively locked in shared mode to allow concurrent, compatible access, but sub-entities within data object 100 are locked in exclusive mode. This way, concurrent access to data object 100 is possible, even though certain entities within data object 100 are being modified. Another type of lock that may be acquired on data object 100 is a "null-mode" lock. A null-mode lock is compatible with all other locking modes and is used only to indicate that the null-mode lock holder has some interest in the locked data object.

As shown in FIG. 1, data object 100 is a partitioned data object made up of partitions 102, 104, 106 and 108. Generally, a partitioned data object exists whenever a data object is maintained in a physically or logically distributed manner, for example, on multiple computers in a computer network, or on multiple logical divisions of a hard disk drive.

For the purpose of the following description, data object 100 is assumed to be a table in a relational database containing data organized into rows (groupings of related data) and columns (categories of data contained in the table). Each of the partitions 102, 104, 106 and 108 can be thought of as a subset of the rows constituting the relational database table 100. It will be appreciated that other types of partitionable data objects may be operated upon within the spirit and scope of the present invention.

Figures 2, 3:
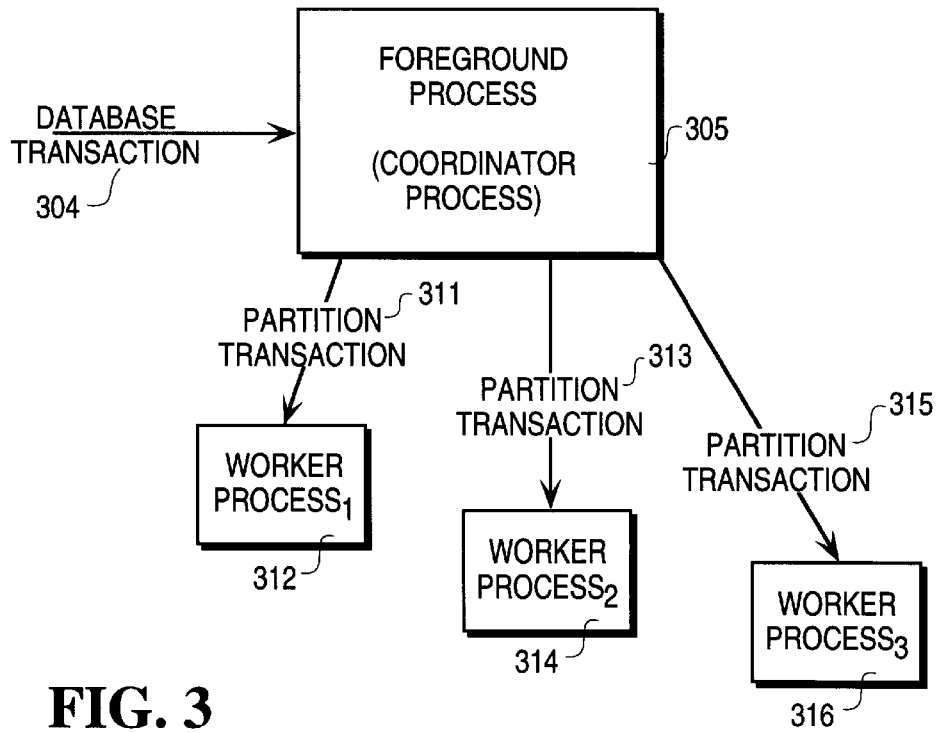
FIG. 2 illustrates decomposition of a command to perform a database transaction into multiple commands to perform partition transactions.
FIG. 3 illustrates a coordinator process allocating work to worker processes.

FIG. 2 illustrates the decomposition of a command to operate on a partitioned database table, "P", into a plurality of commands to operate on partitions of table P. A transaction command 202 indicates that rows of table P having the value "1" stored in column "key" are to be deleted. In FIG. 2, a loop construct 210 is used to decompose the transaction command 202 into a plurality of commands to perform the delete transaction on individual partitions of table P. The commands to operate on the individual partitions are referred to herein as "partition transaction commands" and the transaction command 202 is occasionally referred to as an "overarching transaction command" to distinguish it from partition transaction commands. Values 1, 2, 3, and so forth up to the number of partitions are substituted for Pnum in the partition transaction command "Delete from P(:Pnum) where P(:Pnum).key=1". Consequently the command "Delete from P(:Pnum) where P(:Pnum).key=1" is executed as many times as there are partitions to be operated upon.

As shown in FIG. 3, a transaction command 304 is initially received in a process referred to as a "foreground process" 305. The term "process" is used herein to refer to any executing instance of a computer program, and includes processes and threads. If the database transaction can be resolved into a plurality of partition transactions as described in reference to FIG. 2, units of work representing individual partition transactions may be assigned to processes called "worker processes". When this occurs, the foreground process is considered to be a special type of foreground process called a "coordinator process". The coordinator process may spawn the worker processes or the worker processes may be created independently of the coordinator process. Either way, the worker process is a process that performs one or more units of work at the direction of the coordinator process. In the case of transaction command 304, the coordinator process generates a list of partition transactions 311, 313, 315 that must be performed to effectuate the overarching transaction command 304. Together, the partition transactions 311, 313 and 315 constitute a "workplan", and each partition transaction 311, 313, 315 represents a unit of work that is assigned for execution by a respective worker process 312, 314, 316. In the parlance of inter-process communication (IPC), the coordinator process "sends a message" to the worker process commanding the worker process to carry out the indicated partition transaction.

Dynamic Allocation of Work to Worker Processes

As stated above, work may be assigned to worker processes according to either a static or a dynamic work allocation model. In the static work allocation model, for example, if a coordinator process compiled an overarching database transaction into a workplan including a plurality of partition transactions, the coordinator process could assign all of the partition transactions to a fixed number of worker processes at the outset and then let each worker process execute the assigned units of work until completion. The problem with this approach is that parallel worker processing may not be optimized due to the likelihood that the workers will complete their assigned work at different times.

In the present invention, work is dynamically allocated to worker processes in order to achieve optimal parallel worker processing. When one of a plurality of worker processes finishes its assigned work, additional work is assigned to that worker process. Consequently, the initially created set of worker processes is likely to continue parallel processing for longer than in the static work allocation model.

As stated above, deadlocks between a worker process and another transacting process are more likely in the dynamic allocation model because the set of partition locks required by any one worker is not known at the start of worker processing. One aspect of a database management system that contributes to the propensity for deadlocking in a dynamic work allocation model is the fact that it is usually necessary to hold a partition lock until the overarching database transaction has been completed. A database transaction is completed in one of two ways: by committing the transaction (i.e., making the transacted changes permanent) or by rolling back the transaction (i.e., restoring the database to its pre-transaction state). If a partition lock was released after executing a partition transaction, but before the overarching database transaction was completed, it would become possible for an intervening process to complete a transaction on the partition prior to completion of the overarching database transaction. If a subsequent roll-back of the overarching database transaction was required, the transaction completed by the intervening process would be lost. To avoid this undesirable circumstance, locks acquired on database partitions are held until the overarching database transaction is completed.

Figure 4:
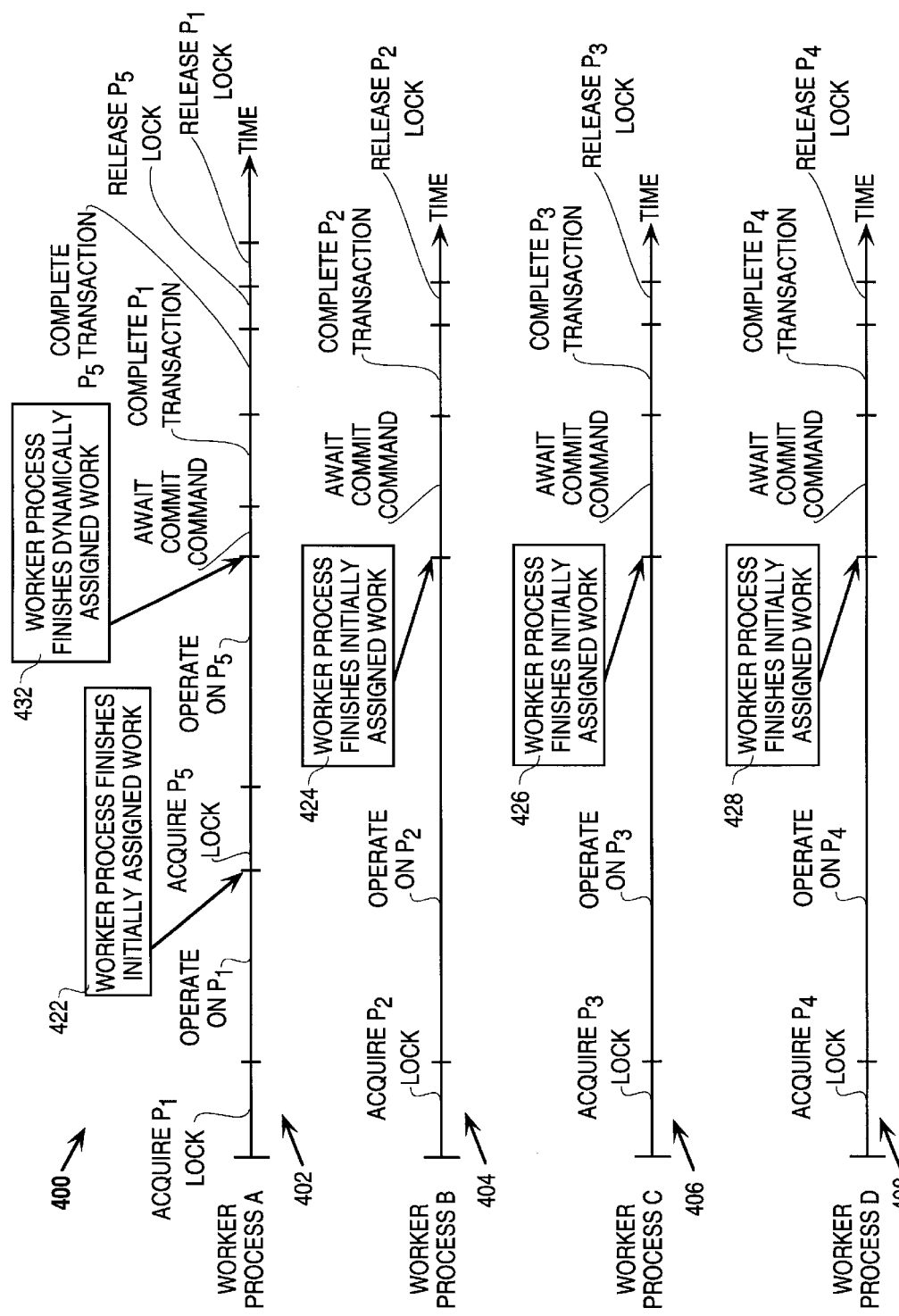
FIG. 4 illustrates dynamic allocation of work to worker processes.

FIG. 4 is a timing diagram 400 illustrating dynamic allocation of work to a plurality of worker processes.

Assume that a coordinator process (not shown) receives a command to perform a database transaction that requires at least five partitions to be operated upon: P1, P2, P3, P4 and P5. Assume further that the coordinator process creates four worker processes, A, B, C and D, to perform operations on the partitions and that the operations are such that the partitions must be exclusively locked. Initially, the coordinator process sends a message to each of the four worker processes commanding them to operate on partitions P1, P2, P3 and P4, respectively. As indicated by the execution timeline 402, worker process A begins by acquiring an exclusive-mode lock on partition P1. After worker process A acquires the P1 lock, worker process A begins operating on P1 to carry out the commanded partition transaction. As stated above, when a process attempts to acquire a lock on a resource, it is suspended until the resource becomes available. Thus, the amount of time required to acquire a lock is dependent upon whether the lock is already incompatibly held by another process and, if so, how much time transpires before the other process releases the lock.

Referring now to timeline 404 of timing diagram 400 shown in FIG. 4, worker process B operates in the same manner as worker process A. That is, worker process B acquires an exclusive-mode lock on partition P2, then operates on partition P2. As shown in timelines 406 and 408, respectively, worker processes C and D likewise acquire exclusive-mode locks on respective partitions P3 and P4, then operate on those partitions.

After the worker processes have been commanded to operate on partitions P1, P2, P3 and P4, respectively, the coordinator process monitors the worker processes to determine when one of the worker processes becomes idle. It will be appreciated that this can be accomplished in a number of ways, including polling the worker processes, receiving a message from the worker processes, or suspending until the operating system detects that one of the worker processes has become idle. In FIG. 4, the first worker process to complete its assigned work is worker process A (shown at 422).

When the coordinator process detects that worker process A has completed its initially assigned work, the coordinator process sends a message to worker process A commanding it to perform a partition transaction on partition P5, the last partition to be operated on. Thus, on timeline 402, after worker process A has completed operating on P1, it next acquires an exclusive-mode lock on P5 and then operates on P5 according to the commanded partition transaction. While worker process A is operating on partition P5, worker processes B, C and D complete their assigned units of work and await a commit command from the coordinator process. This is shown on timelines 404, 406, 408 at the completion of the respective operations on partitions P2, P3 and P4 (at boxes 424, 426 and 428, respectively). As discussed above, each of the partition operations must be completed before individual partition operations can be completed (committed or rolled back). Consequently, a commit command is not received by any of the worker processes until worker process A completes operating on partition P5. As shown on timeline 402 at box 432, after worker process A completes operating on partition P5, it waits for a commit command. Then, after the commit command is received, worker process A commits the P1 transaction and then the P5 transaction, thereby completing those transactions. Worker processes B, C and D receive commit messages at roughly the same time as worker process A and likewise complete their respective transactions on partitions P2, P3 and P4. This is shown on timelines 404, 406 and 408, respectively.

Returning to timeline 402, after worker process A has completed transaction P5, worker process A releases the exclusive-mode lock on partition P5 and then releases the exclusive mode lock on partition P1. Similarly, as shown on timelines 404, 406 and 408, respectively, worker processes B, C and D release their exclusive-mode locks on partitions P2, P3 and P4 after completing the respective transactions on those partitions.

Deadlock Between a Worker Process and a User Process

Figure 5:
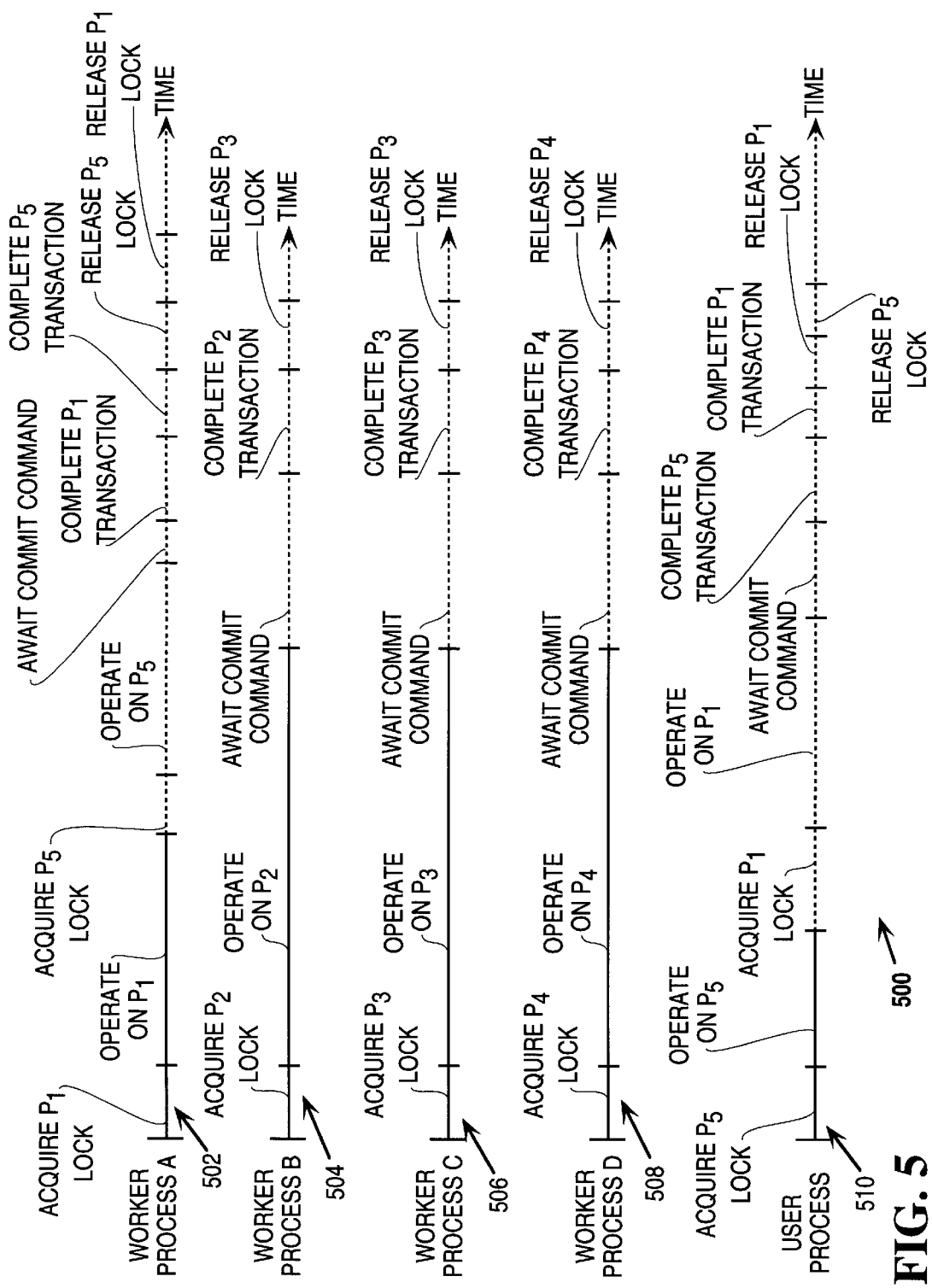
FIG. 5 illustrates a deadlock condition between a worker process and another process arising after significant processing has been accomplished.

FIG. 5 is a timing diagram 500 illustrating the manner in which a late-detected deadlock between a worker process and another process can occur. A timeline indicating the activities of the other process, referred to as a "user process", is shown at 510. Timelines 502, 504, 506 and 508 correspond to worker processes A, B, C and D, respectively, and are identical to timelines 402, 404, 406 and 408 of timing diagram 400 except that dashed lines are used to indicate where a late-detected deadlock prevents successful completion of the database transaction on the partitioned object. Referring to timeline 510 of the user process, the user process first acquires an exclusive-mode lock on P5, then begins operating on P5. When the user process has completed operating on P5, it attempts to acquire a lock on partition P1. However, as discussed above in reference to FIG. 4, and as shown on timeline 502, worker process A holds an exclusive-mode lock on partition P1. Moreover, after worker process A has completed operating on partition P1, worker process A attempts to acquire an exclusive mode lock on partition P5. Since worker process A requires a lock incompatibly held by the user process and the user process requires a lock incompatibly held by the worker process, a deadlock condition arises.

Eventually, a process assigned the job of detecting deadlocked processes will determine that no progress is being made in either the user process or the coordinator process, which has allocated work to worker processes A, B, C and D. At that point, work performed by either the coordinator process (i.e., work done by worker processes A, B, C and D on behalf of the coordinator process) or the user process must be rolled back to allow completion of the other process. It will be appreciated that considerable waste will result if the coordinator process must be rolled back. The work performed on partitions P1, P2, P3 and P4 must be rolled-back and then repeated some time after the user process has completed. This is undesirable.

Acquisition of Locks on Behalf of Worker Processes

Figure 6:
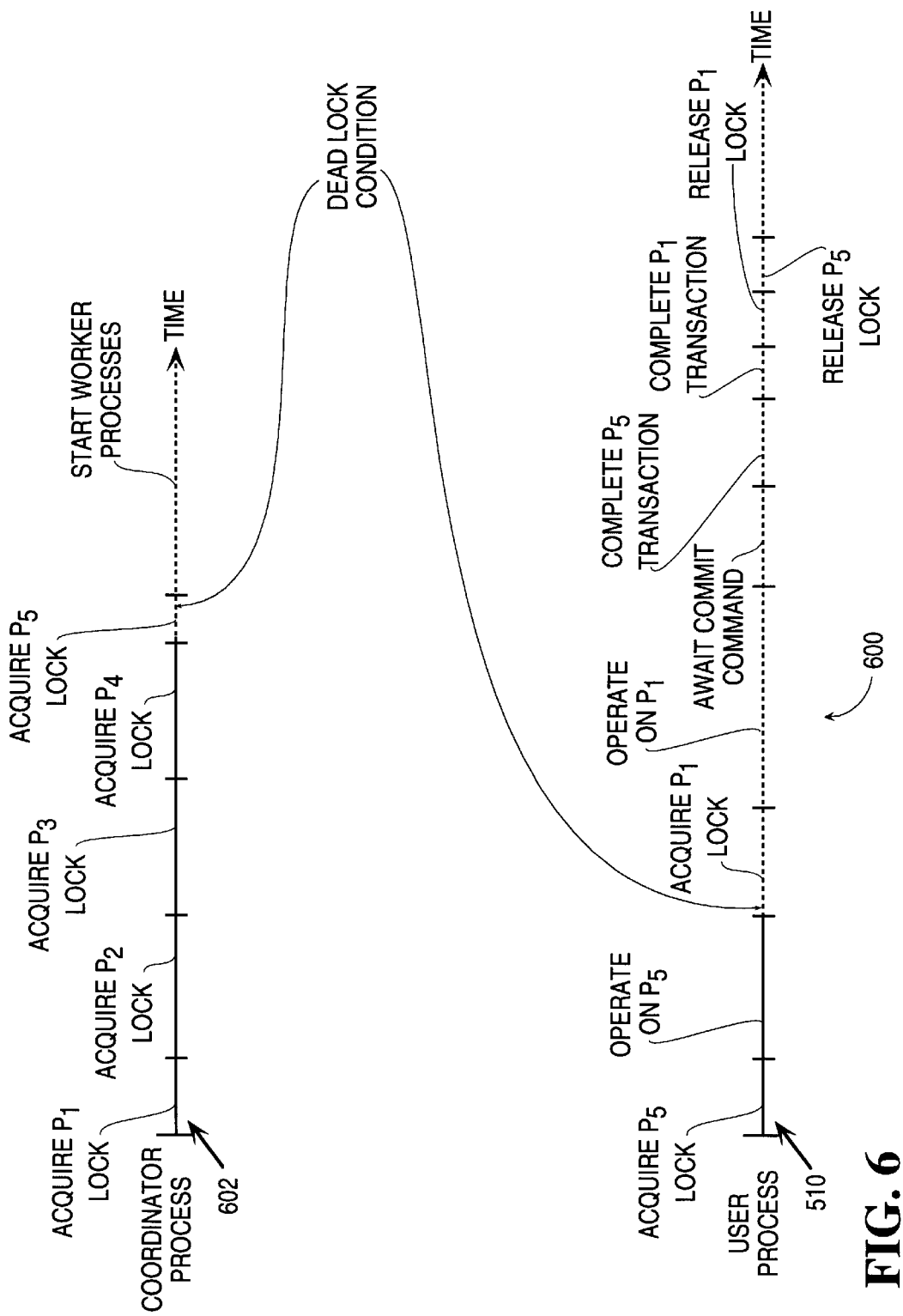
FIG. 6 illustrates a deadlock condition between a coordinator process and another process.

FIG. 6 is a timing diagram illustrating the manner in which the present invention can be used to achieve early deadlock detection in the dynamic work allocation model. Typically, when a resource must be locked, the resource is locked by the process intending to operate on the resource. According to the present invention, however, instead of having the worker processes acquire partition locks as the need arises, the coordinator process acquires the locks on behalf of the worker processes, before allocating work to the workers. This is possible because the coordinator is aware of the partitions to be operated upon by the worker processes and therefore is capable of determining which locks will ultimately need to be acquired to complete the overarching database transaction. Deadlock conditions are still possible, but since any deadlock condition will necessarily arise when the coordinator process attempts to acquire the needed partition locks and before work has been allocated to the worker processes, the deadlock can be detected before substantial changes have been made to the database. Consequently, if a deadlock condition arises, the amount of work that must be rolled back upon termination of the coordinator process is minimal.

In the timing diagram of FIG. 6, the same five partitions must be operated upon as in FIG. 4 and FIG. 5. However, the coordinator process begins acquiring each of the locks before any partition operations have been performed by the workers. As described above, the user process shown in timeline 510 of FIG. 6 first acquires the lock to partition P5. Next, the user process operates on partition P5 and then attempts to acquire the lock to partition P1. Meanwhile, the coordinator process shown in timeline 602 has acquired the locks to partitions P1, P2, P3 and P4 and then attempts to acquire the lock to partition P5. As shown in FIG. 6, a deadlock condition arises since the coordinator is attempting to incompatibly acquire a lock held by the user process and the user process, likewise, is attempting to incompatibly acquire a lock on a partition held by the coordinator process. However, if the coordinator process is terminated at this point, no partition operations need to be rolled back. Thus, by reassigning the allocation of locks to the coordinator process and having the coordinator process acquire the necessary locks on behalf of the worker processes at the outset of the database transaction, it becomes possible to detect deadlocks early in the transaction instead of later after substantial work has already been performed.

Unexpected Death of a Lock-Holding Process

Occasionally, a process terminates prematurely. This is referred to as process death. A process may encounter an unexpected condition and self-terminate or the process may be terminated ("killed") by the operating system or another process. In a system which employs resource locking, there must be a mechanism for detecting the death of a process that holds locks to shared resources. Otherwise, the shared resources will remain locked by the dead process potentially forever.

In many multiprocessing systems, a background process is provided to monitor other processes and to clean up loose ends after a process is prematurely terminated. For example, in the one embodiment of the present invention, a process referred to as "process monitor" is executed in the background to determine if another process has unexpectedly died. If so, process monitor determines whether the dead process held any locks. If the dead process did hold locks, process monitor releases the locks held by the dead process. The action by process monitor to release locks held by a dead process is referred to as lock "reclamation", the locks being reclaimed by the system.

Unexpected Death of a Coordinator Process

As stated above, in the present invention a coordinator process acquires resource locks on behalf of worker processes according to work to be allocated to the worker processes. In this arrangement, the worker processes do not need to acquire locks to operate on partitions because it is assumed that the coordinator process holds locks on their behalf. If the coordinator process dies before the workers have completed processing, however, this assumption may no longer be true and a resource conflict may arise.

Figure 7:
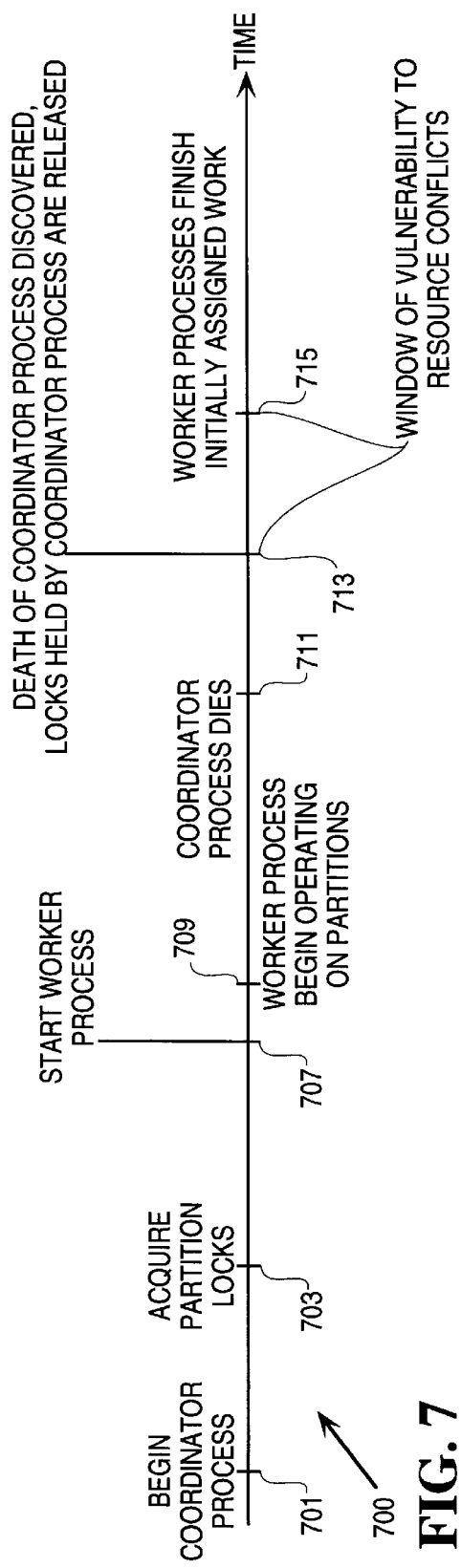
FIG. 7 is a timeline indicating a first period of vulnerability to resource conflicts in a locking scheme in which a coordinator process acquires locks on behalf of worker processes.

FIG. 7 is a timeline 700 illustrating a window of vulnerability to resource conflicts caused by premature death of a coordinator process. At time 701, the coordinator process begins, receiving a command to perform a database transaction on a partitioned object and resolving the transaction into a plurality of partition transactions. At time 703, the coordinator process acquires locks to each of the plurality of partitions to be operated upon. As discussed above, the coordinator holds these locks on behalf of a plurality of worker processes. At time 707, the worker processes are started and, at time 709, the worker processes begin operating on the partitions, assuming that the partitions are locked on their behalf by the coordinator process. Now, suppose that the last of the worker processes will finish processing its assigned work at time 715. If the coordinator process dies prior to time 715, and if the locks held on behalf of the worker processes are released (e.g., by process monitor) prior to time 715, it becomes possible for another process to acquire a lock on a partition that is incompatible with the activities of one of the worker processes. A resource conflict may arise resulting in data corruption or inaccurately read data. As shown in FIG. 7, the window of time in which the system is vulnerable to resource conflicts extends from time 713, at which the locks held by the coordinator process are released, to time 715, when the last of the worker processes has completed its initially assigned work.

Figure 8:
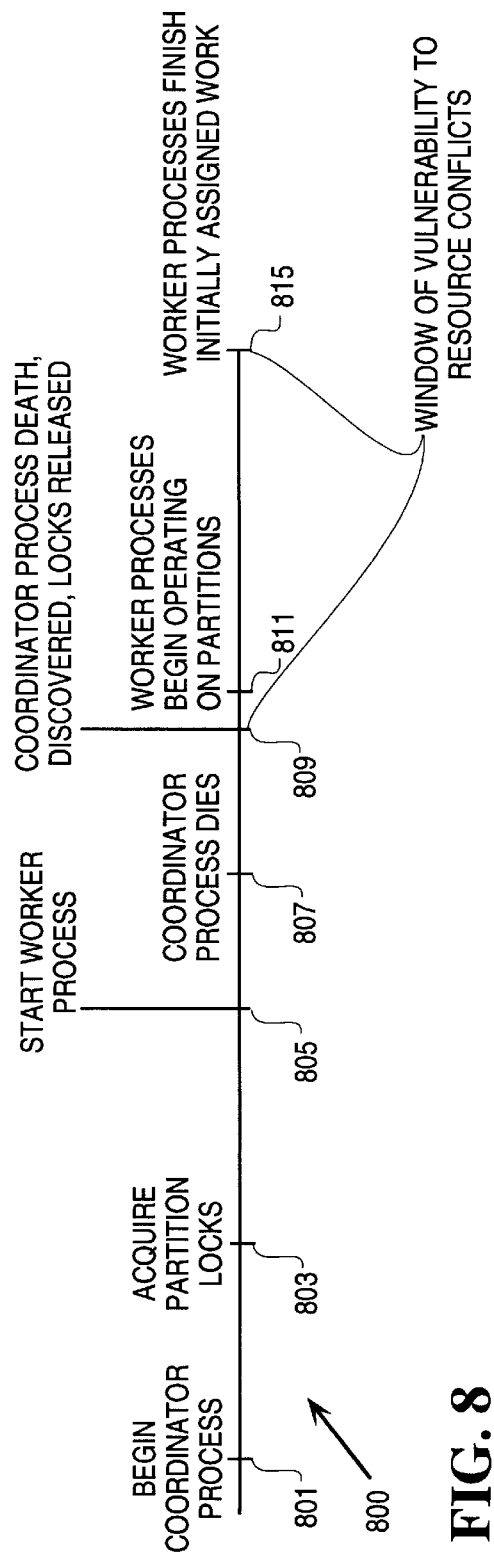
FIG. 8 is a timeline indicating a second period of vulnerability to resource conflicts in a locking scheme in which a coordinator process acquires locks on behalf of worker processes.

FIG. 8 illustrates another window of vulnerability to resource conflicts caused by the premature death of a coordinator process. A coordinator process begins at time 801, acquires partition locks at time 803 and starts worker processes at time 805. If the coordinator process dies at time 807, prior to the commencement of work by the worker processes at time 811, and if the coordinator's death is discovered with consequent release of locks held by the coordinator at time 809, prior to the commencement of work by the worker processes at time 811, the workers will begin processing on the incorrect assumption that partition locks are held on their behalf. As shown in FIG. 8, the window of vulnerability extends from time 809, when the locks are prematurely released, until time 813, when the last of the worker processes completes processing.

The difference between the resource conflict scenarios of FIG. 7 and FIG. 8 is that the window of vulnerability to resource conflicts in FIG. 7 opens after the workers have begun operating on their assigned partitions and the window of vulnerability indicated by FIG. 8 opens before the workers begin operating on their assigned partitions. As described below, both resource conflict scenarios are addressed by the present invention.

Flow Diagram of a Coordinator Process

Figure 9:
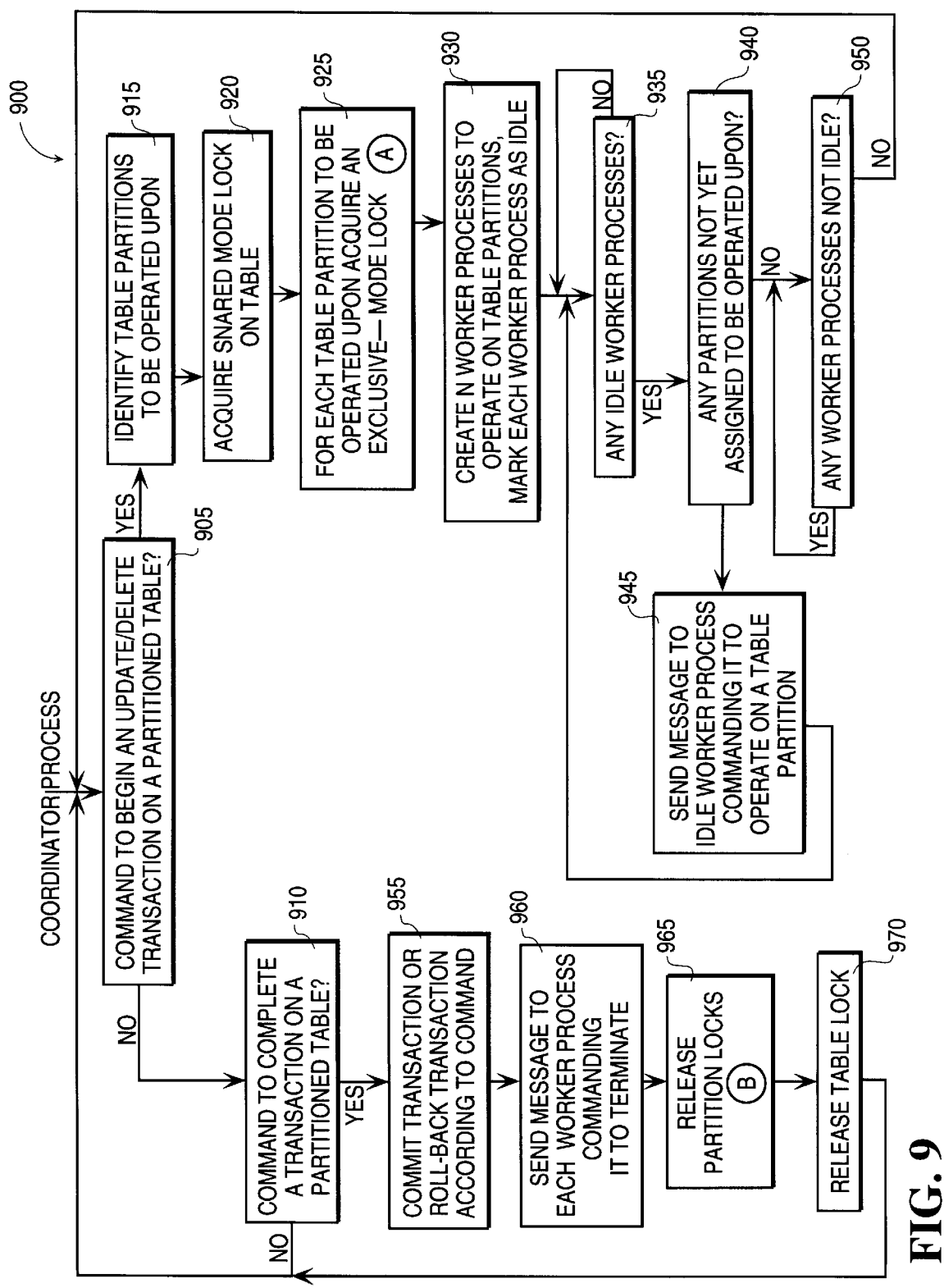
FIG. 9 is a flow diagram of a coordinator process that acquires locks on behalf of worker processes according to the method of the present invention.

FIG. 9 illustrates a flow diagram 900 of a coordinator process according to one embodiment of the present invention. At step 905, input received from a user or from another process is examined to determine if it is a command to modify a partitioned table. If not, then at step 910 the input is further examined to determine if it is a command to complete (i.e., commit or roll-back) a transaction on a partitioned table. If not, then execution of the coordinator process loops back to step 905 to examine subsequent input.

If, at step 905, the input is determined to be a command to perform a transaction on a partitioned table, then at step 915, the coordinator process identifies each of the table partitions to be operated upon. At step 920, the coordinator process acquires a shared-mode lock on the partitioned table and at step 925, the coordinator process acquires an exclusive-mode lock on each table partition to be operated upon. Step 925 is marked "A" to indicate that it is the subject of another flow diagram (see FIG. 10, described below). At step 930, the coordinator process creates N worker processes to operate on table partitions, marking each worker process as idle. The value of N is typically selected to be less than the total number of partitions to be operated on, so that work remains to be allocated even after the N worker processes have begun operating on table partitions.

At step 935, the coordinator process determines if any of the worker processes are idle. Of course, on the first execution of step 935 after receiving a command to perform a database transaction on a partitioned table, all of the worker processes will be idle. After an idle worker process is identified at step 935, the list of tables identified in step 915 (i.e., the workplan) is inspected at step 940 to determine if any partitions remain to be operated upon. If so, then at step 945, the coordinator process sends a message to the idle worker process identified at step 935 commanding the idle worker process to operate on the table partition. As stated above, the act of sending a message to a worker process commanding it to carry out a partition transaction is referred to as "allocation of a unit of work" to the worker process by the coordinator process. As discussed further below, when the idle worker process receives the message to begin operating on a table partition, it ceases to be an idle worker process until it completes its assigned work.

After the idle worker process identified in step 935 is put to work at step 945, execution loops back to step 935 to determine if any idle worker processes remain. If so, then step 940 is executed to determine if partitions remain to be operated upon and step 945 is executed to allocate a partition to the next idle worker process. Thus, the sequence of steps 935, 940 and 945 is iteratively executed to put each of the idle worker processes to work.

At some point, either no more idle worker processes will remain or no partitions will remain to be operated upon. If, at step 935, no idle worker processes are detected, execution loops back to step 935 to poll for idle worker processes again. When one of the worker processes completes its assigned work, it will so indicate by marking itself as idle and will be detected at step 935. It will be appreciated that the branch from step 935 to itself represents a potentially infinite polling loop and that it may be necessary to add a timeout or iteration threshold that will cause the loop to be exited. It will be further appreciated that the polling construct represented by the branch from step 935 back to itself may be implemented as a process blocking function. That is, the coordinator process could simply be suspended by the operating system until one of the worker processes indicates that it has completed its assigned work and again becomes idle. At that time, execution of the coordinator process could be resumed.

If, at step 940, it is determined that no partitions remain to be operated upon, the coordinator process repeatedly executes step 950 until it determines that all of the worker processes have completed processing and have become idle. At this point, the commanded transaction received in step 905 has been performed, but not yet completed (committed or rolled-back). Execution of the coordinator process returns to step 905 to enter the input loop to await a command to complete the transaction. Eventually a command to complete the database transaction will be detected in step 910.

When a command to complete a transaction is received at step 910, the coordinator process commits the transaction or rolls back the transaction at step 955 according to the command. Then, at step 960, the coordinator process sends respective messages to the worker processes commanding the worker processes to terminate. At step 965 the coordinator process releases the exclusive-mode partition locks held on behalf of the worker processes and, at step 970, the coordinator process releases the shared-mode table lock. Step 965 is marked "B" to indicate that it is the subject of another flow diagram (see FIG. 11, described below).

Recall that resource conflicts become possible if the coordinator process dies before the worker processes complete their respective work assignments. In the resource conflict scenario discussed in reference to FIG. 8, the coordinator process dies and the locks held by the coordinator process on behalf of the worker processes are released before the worker processes have begun operating on their respective partitions. In such a case, the worker processes incorrectly assume that the coordinator process holds locks on their behalf. What is needed is a mechanism for the worker processes to determine whether locks are held by the coordinator process at the time the worker processes begin operating on the respective partitions.

As discussed above, in one embodiment of the present invention a resource lock is a data object including a validation attribute. In the present invention, the validation attribute is used by the worker processes to determine whether the coordinator process continues to hold locks on their behalf just before the worker processes begin operating on the respective partitions. Ordinarily, when a lock is not held by a coordinator process, the validation attribute is set to a null value (e.g., zero). Also, in one embodiment of the present invention, whenever a lock is reclaimed after the death of its holder the validation attribute is set to a null value ("cleared"). There is one important exception to the clearing of the validation attribute during lock reclamation. The validation attribute is not cleared during lock reclamation if another process holds a compatible lock to the resource. The significance of this fact is discussed further below.

In one embodiment of the present invention, whenever a coordinator process acquires a partition lock on behalf of a worker process, the coordinator process assigns a value to the lock validation attribute identifying the coordinator as the lock holder. Before a worker process begins operating on a partition, the worker process checks the validation attribute of the lock corresponding to the partition. The worker process proceeds to execute on the partition only if the validation attribute identifies the coordinator process. If the validation attribute does not identify the coordinator process, the worker process performs certain clean-up activities (described below) and then terminates. By designing the worker processes to confirm that the lock validation attribute identifies the coordinator process before beginning operation on the partition, the window of vulnerability to resource conflicts indicated in FIG. 8 is closed.

Figure 10:
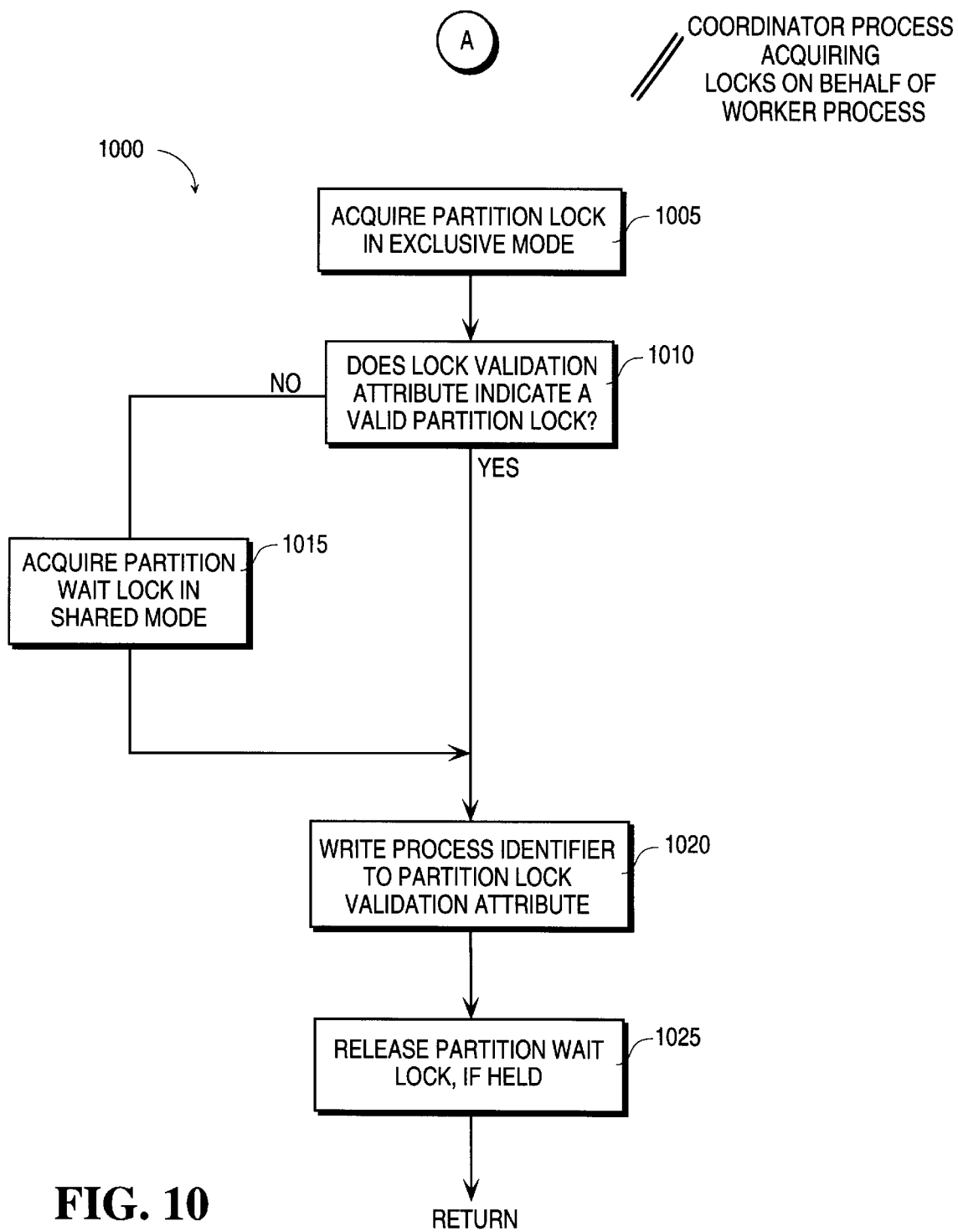
FIG. 10 is a flow diagram illustrating the manner in which a coordinator process acquires locks on behalf of a worker process.

FIG. 10 is a flow diagram 1000 illustrating the manner in which a coordinator process acquires a partition lock on behalf of worker processes. Flow diagram 1000 is marked "A" to indicate that it represents a more detailed description of step 925 of flow diagram 900 (also marked "A").

At step 1005, the coordinator process acquires a partition lock in exclusive mode. The coordinator process examines the lock validation attribute at step 1010 to determine whether the validation attribute is null. If the validation attribute is not null, it is assumed that the lock had been held by another coordinator process that wrote its identifier into the validation attribute, but has since died. In that case, at step 1015, the presently executing coordinator process acquires a lock called a partition "wait lock" in shared mode. As discussed more fully below in reference to FIG. 12, the partition wait lock is held in exclusive mode by worker processes until the overall database transaction to which their work pertains is completed (committed or rolled-back). By forcing processes seeking to acquire partition locks to acquire a partition wait lock upon learning that a prior coordinator process has died, the lock-seeking process will be blocked until the workers release the respective wait-locks on the partitions. This way, resource conflicts between worker processes of a dead coordinator and processes seeking partition locks held at one time on behalf of the worker processes by the dead coordinator are avoided. By using the partition wait lock to serialize access to a partition upon death of a coordinator process, the window of vulnerability to resource conflicts indicated in FIG. 7 is closed.

Returning to step 1015 of flow diagram 1000, once the coordinator process acquires the partition wait lock in shared mode, the coordinator process can proceed on the assumption that any worker processes of the dead coordinator have released their exclusive-mode wait locks and therefore are no longer operating on the partition sought to be locked. If, at step 1010, the coordinator process determines that the lock validation attribute is null, then the coordinator process may proceed on the assumption that no prior coordinator process has died before its workers completed processing the partitions. Either way, at step 1020, the coordinator process writes a self-identifying value (e.g., a process identifier) into the partition lock validation attribute. At step 1025, the coordinator process releases the partition wait lock, if held, then returns. In one embodiment of the present invention, flow diagram 1000 is executed as many times as there are partition locks to be acquired by the coordinator process.

Figure 11:
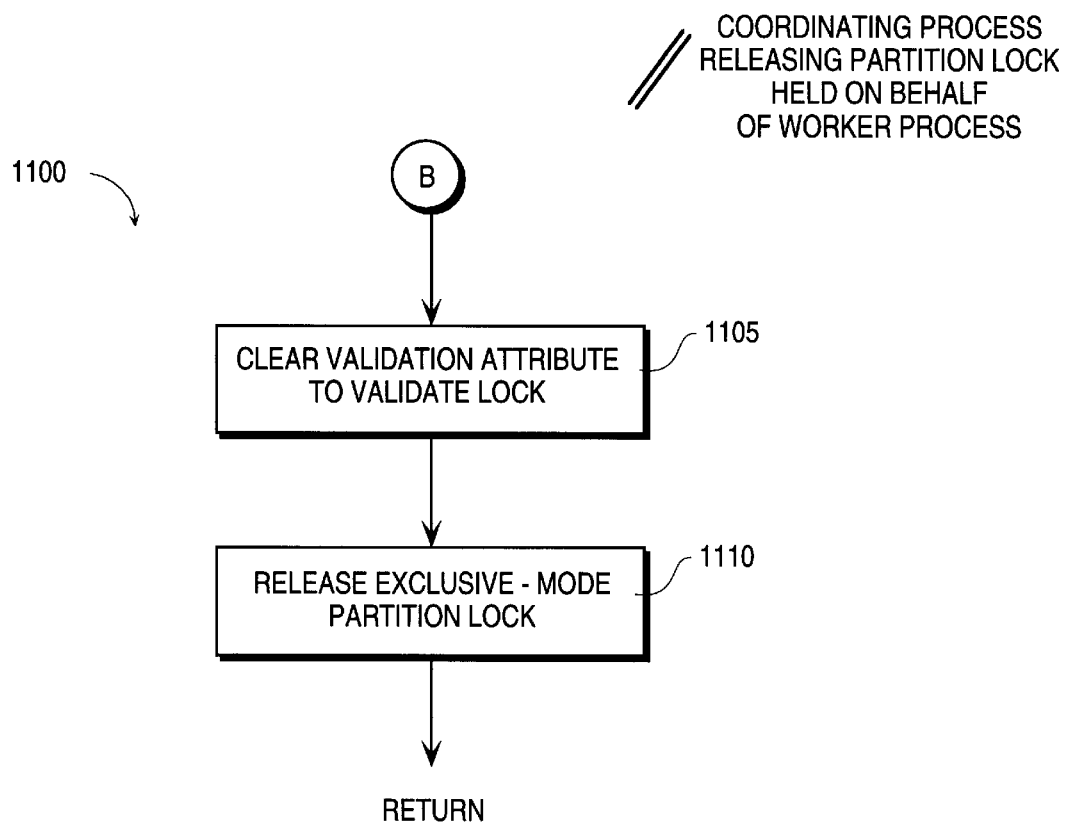
FIG. 11 is a flow diagram illustrating the manner in which a coordinator process releases locks held on behalf of a worker process.

FIG. 11 is a flow diagram 1100 illustrating the release of a partition lock held by a coordinator process on behalf of a worker process. Flow diagram 1100 is marked "B" to indicate that it represents a more detailed description of step 965 of flow diagram 900 (also marked "B").

At step 1105 of flow diagram 1100, the coordinator process writes a null value to the validation attribute, thereby clearing the coordinator process identifier written there in step 1020 of FIG. 10. The step of clearing the validation attribute is referred to as "validating" the lock for all subsequent acquirers. After validating the partition lock, the coordinator releases the exclusive-mode partition lock at step 1110. The coordinator process executes steps 1105 and 1110 to release each lock held after the database transaction commanded in step 905 of FIG. 9 has been completed.

Flow Diagram of a Worker Process

Figure 12:
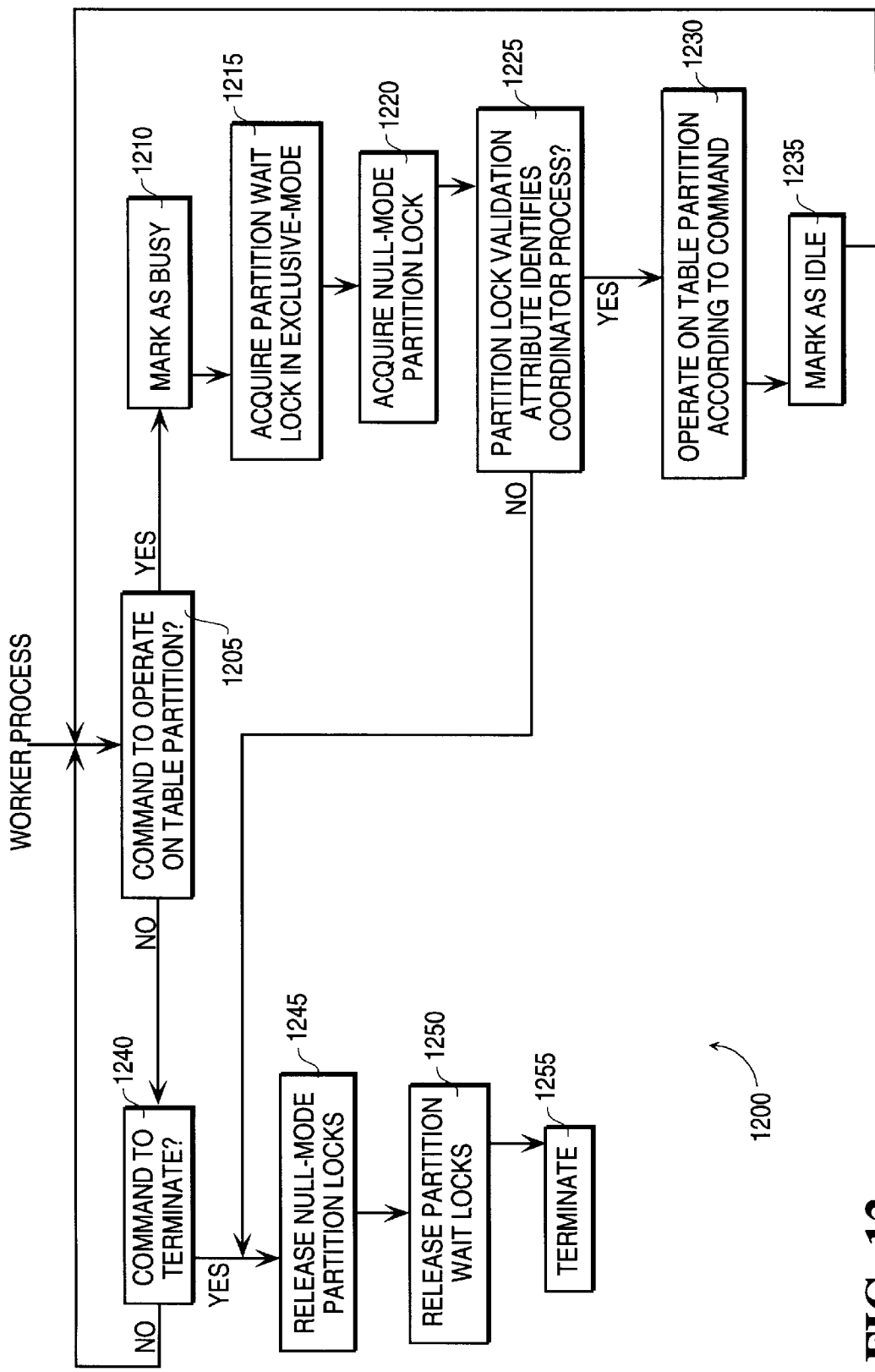
FIG. 12 is a flow diagram of a worker process according to the method of the present invention.

FIG. 12 is a flow diagram 1200 of a worker process according to one embodiment of the present invention. At step 1205, the worker process examines input to determine whether it indicates a command to operate on a table partition. Since the worker is typically a background process (does not interact with a computer-user), input to the worker process generally consists of one or more messages received via an inter-process communication (IPC) mechanism. If the input indicates a command to operate on a table partition, the worker process first marks itself as busy at step 1210. This can be accomplished by setting a flag in a data structure, sending a message to the coordinator process or any other technique for communicating to the coordinator process that the worker process is no longer idle. Next, at step 1215 the worker process acquires a partition wait-lock in exclusive mode.

As stated above, if the coordinator process dies before the worker process completes its assigned work and the partition lock held by the coordinator process is released (by action of process monitor, for example), a subsequent acquirer of the partition lock will attempt to acquire the partition wait-lock. However, since the worker process holds the partition wait lock in exclusive mode, the subsequent acquirer of the partition lock will be suspended ("blocked") until the worker process releases the exclusive-mode partition wait lock acquired in step 1215. Also as stated above, the subsequent acquirer of the partition lock determines whether a prior holder has prematurely terminated by checking the partition lock validation attribute (FIG. 10, step 1010). If the partition lock validation attribute indicates premature termination of a prior holder, the subsequent partition lock acquirer attempts to acquire the partition wait-lock. Thus, the partition wait-lock serves to synchronize access to the partition by the remnant worker process (a worker process existing after its coordinator process has died) and the subsequent partition lock acquirer by causing the subsequent partition lock acquirer to be suspended until the remnant worker process has completed operating on the partition.

It should be noted that having a third process attempt to acquire the partition wait-lock after determining that the partition lock is not valid is a particularly efficient way for the third process to determine that the remnant worker process has completed. Instead of requiring the third process to repeatedly acquire and release the partition lock until the validation attribute indicates that the partition lock is valid (a polling construct), the third process is simply suspended when it attempts to acquire the partition wait-lock and is resumed when the remnant worker process completes and releases the partition wait-lock (an event-driven technique).

At step 1220, the worker process acquires a null-mode lock on the partition. As stated above, a null-mode lock is compatible with all other locks and serves only to indicate that the null-mode lock holder has some interest in the corresponding resource. Recall that, during the lock reclamation process, the validation attribute of a reclaimed lock is cleared unless another process holds a compatible lock to the same resource. Thus, when a coordinator process holding an exclusive-mode partition lock dies, the reclamation process (e.g., process monitor) would ordinarily clear the validation attribute upon reclamation of the partition lock. This would create a problem, however, since a subsequent acquirer of the partition lock would be unable to determine that the lock had been held by a now dead coordinator process. Recall that such a determination is a decision step in the partition lock acquisition process (FIG. 10, step 1010). In one embodiment of the present invention, the lock reclamation process is prevented from clearing the partition lock validation attribute by having the worker process acquire a null-mode partition lock at step 1220 of FIG. 12. Process monitor still reclaims the lock when the coordinator process dies, but upon detecting that there is another compatible lock on the partition, viz., the null-mode lock held by the worker process, process monitor does not clear the validation attribute. This allows the death of the coordinator process to be detected at step 1010 of flow diagram 1000 as discussed above.

At step 1225 of flow diagram 1200, the worker process determines whether the lock validation attribute identifies the coordinator process. If so, then the coordinator process has not died prior to acquisition of the null-mode partition lock by the worker process and, at step 1230, the worker process proceeds to operate on the table partition according to the command received at step 1205. After the worker process has completed operating on the table partition at step 1230, it marks itself as idle at step 1235 so that it may receive further work assignment from the coordinator process at step 1205.

If the input message examined at step 1205 does not indicate a command to operate on a table partition, the input message is further examined at step 1240 to determine whether it represents a command to terminate the worker process. If not, execution loops back to step 1205 to examine the next input message. If the input message is a command to terminate, then at step 1245 the worker process releases all null-mode partition locks that it holds and, at step 1250, the worker process releases all partition wait locks that it holds. It will be appreciated that the order of steps 1245 and 1250 could be reversed. Finally, at step 1255, the worker process terminates.

If, at step 1225, the worker process determines that the partition lock validation attribute does not identify the coordinator process, the worker process assumes that the coordinator process has died prior to acquisition of the null-mode partition lock by the worker process. Consequently, the worker process executes steps 1245 and 1250 before terminating at step 1255.

Figure 13:
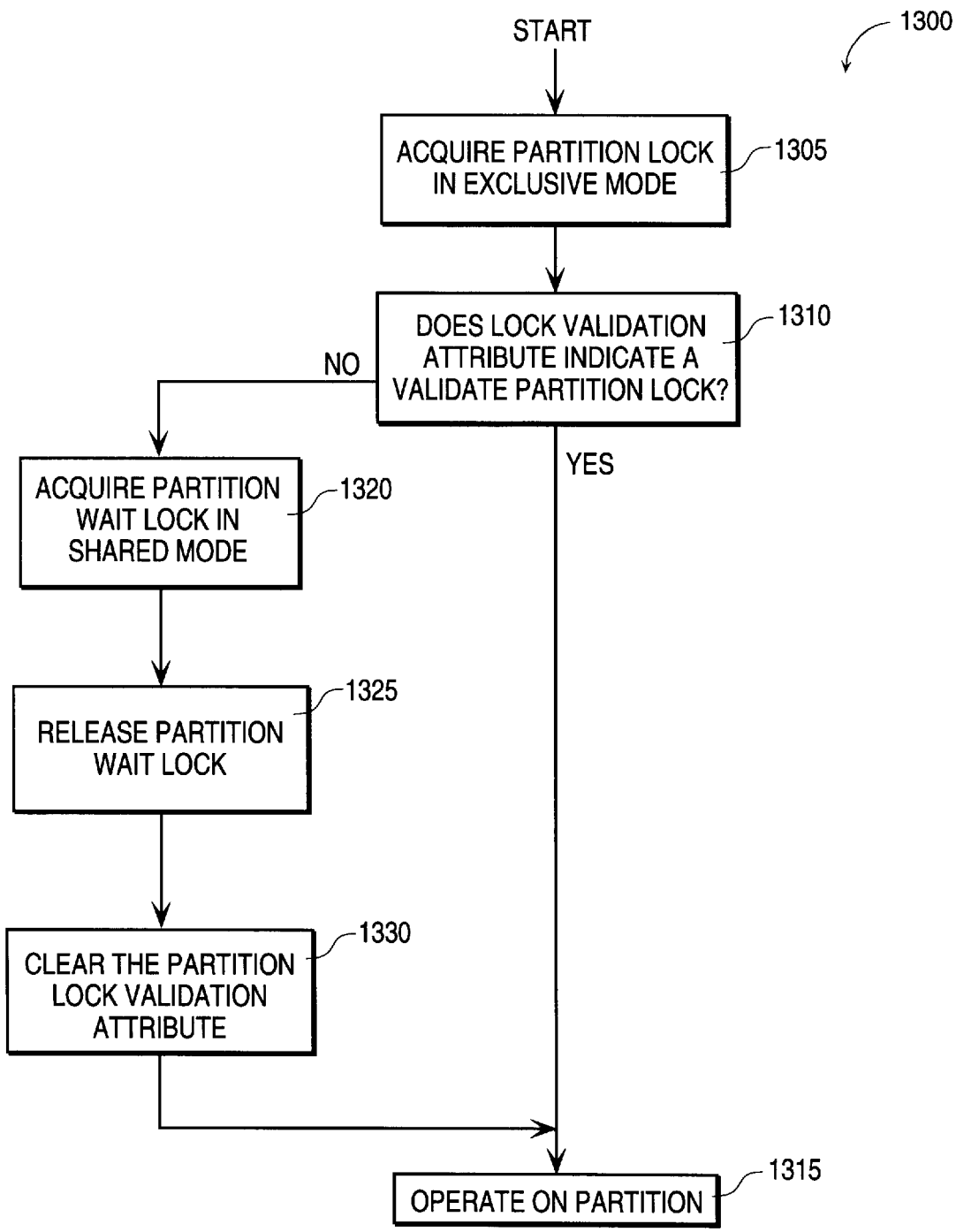
FIG. 13 is a flow diagram of a non-coordinator process that acquires a partition lock.

FIG. 13 is a flow diagram 1300 illustrating acquisition of a partition lock by a foreground process other than a coordinator process (referred to as a "non-coordinator" process). At step 1305, the non-coordinator process acquires the partition lock in exclusive-mode. At step 1310, the lock validation attribute is examined to determine whether it indicates a valid partition lock. If the validation attribute is null (a valid partition lock), it is assumed that no worker processes continue to operate on the partition and the non-coordinator process may itself proceed to operate on the partition at step 1315. If, at step 1310, a non-null validation attribute is detected, the non-coordinator process attempts to acquire the partition wait lock in shared mode at step 1320. As stated above, the shared mode acquisition of the partition wait lock is a synchronizing step that serves to serialize access to the partition by a remnant worker process and a subsequent acquirer of the partition lock (in this case the non-coordinator process). The non-coordinator process will be suspended at step 1320 until the exclusive-mode wait lock held by a worker process, if any, is released. Execution of the non-coordinator process is resumed upon acquisition of the partition wait lock. At this point, the non-coordinator process holds an exclusive mode lock on the partition and can safely assume that there are no remnant worker processes operating on the partition. At step 1325, the non-coordinator process releases the partition wait lock and, at step 1330, thenon-coordinator process clears the partition lock validation attribute (for example, by assigning a null value to the validation attribute). Finally, at step 1315, the non-coordinator process operates on the partition.

Resource Lock Structure

Figure 14:
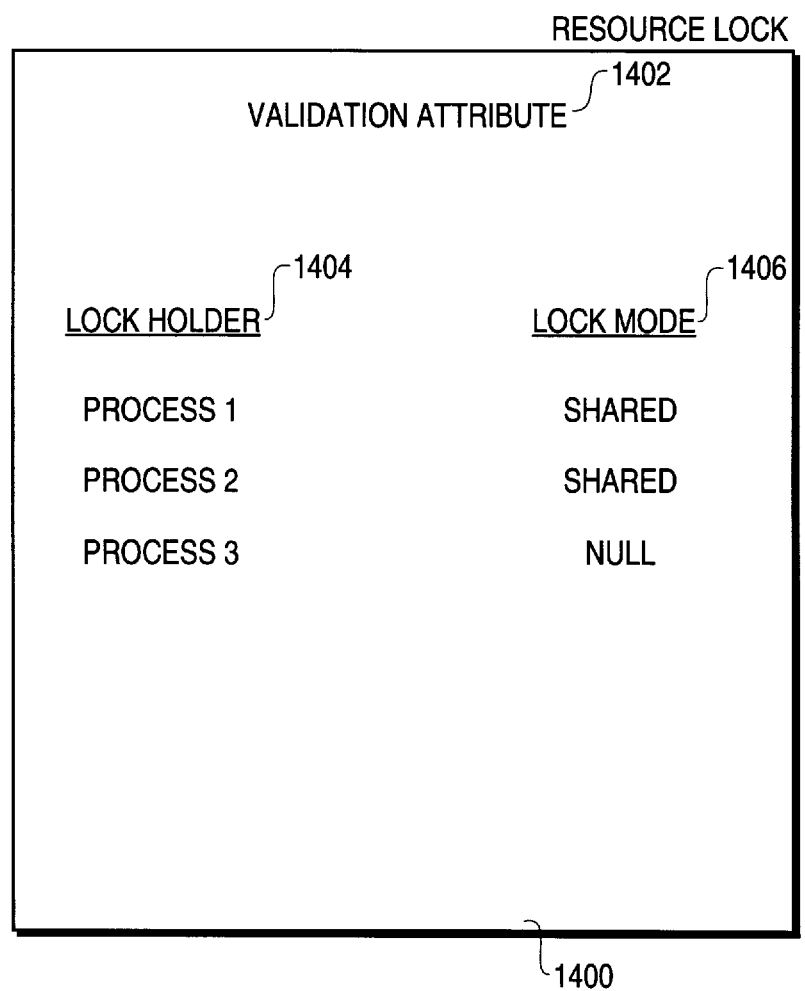
FIG. 14 illustrates the structure of a lock data object.

FIG. 14 illustrates the structure of a resource lock 1400 according to one embodiment of the present invention. The resource lock 1400 includes a validation attribute 1402, a list of present lock holders 1404 and a list 1406 of modes in which the resource is presently locked. Each entry in the list of lock modes 1406 corresponds to an entry in the list of lock holders 1404 so that for every lock holder a corresponding lock mode is listed. It will be appreciated that, at any given time, each of the lock modes in the list of lock modes 1406 must be compatible with one another. For example, in lists 1404 and 1406 of FIG. 14, processes one and two are indicated as holding respective shared mode-locks on the resource, while process three is indicated as having a null-mode lock on the resource. If a fourth process attempted to acquire an exclusive-mode lock on the resource, the lock would be denied.

It should be noted that the partition lock and the partition wait lock described above are two separate locks on the same resource. This presents no conflict since the partition lock and the partition wait lock serve different purposes. The partition lock is used to control access to the resource, while the partition wait lock is used as a synchronizing element to indicate that a remnant worker process has completed operating on the resource. As discussed above, the partition lock and the partition wait lock may be held in various different lock modes.

Computer System Overview

Figure 15:
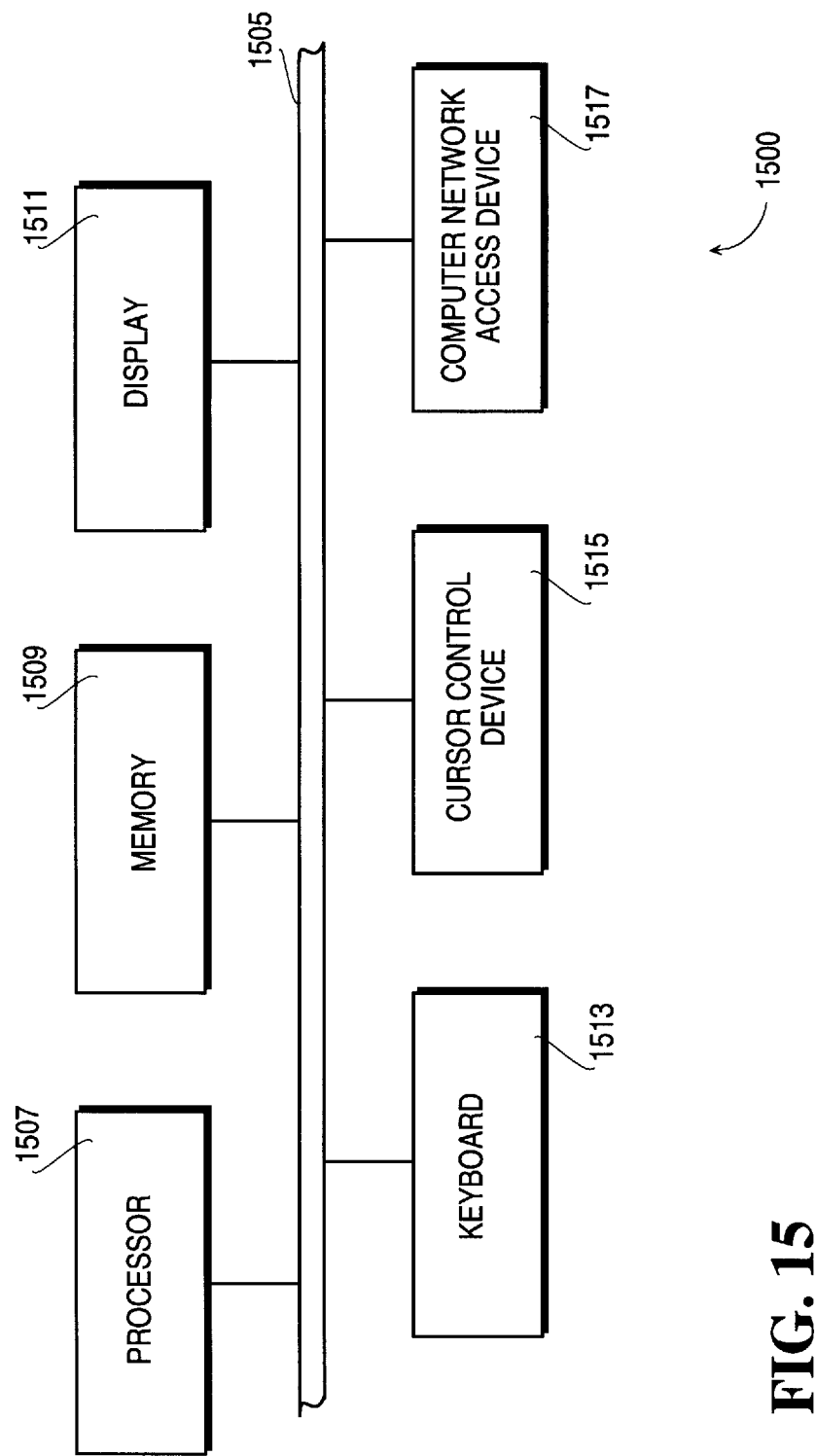
FIG. 15 depicts the architecture of a computer that can be used to execute the method steps of the present invention.

FIG. 15 depicts a block diagram of a general purpose computer system 1500 for performing the individual steps of the method of the present invention. The computer system 1500 includes a processor 1507, memory 1509, display device 1511, keyboard 1513, cursor control device 1515, and computer network access device 1517 each coupled to a bus 1505. Although not individually shown, bus 1505 typically includes an address bus, data bus and control bus. Cursor control device 1515 may be a mouse, trackball, pen or any other device for manipulating a cursor on display device 1511. Both the cursor control device 1515 and the keyboard 1513 enable the computer system 1500 to receive input from a computer-user. Network access device 1517 may be a modem network adapter card or any other device for coupling computer 1500 to a computer network.

Memory 1509 may include both system memory (e.g., random access memory) and non-volatile storage such as a semiconductor read-only-memory, hard disk-drive, floppy disk-drive, optical disk-drive or any other computer-readable medium. When power is applied to the computer system 1500, program code defining an operating system is loaded from non-volatile storage into system memory by processor 1507 or another device, such as a direct memory access controller (not shown), having access to memory 1509. Sequences of instructions comprised by the operating system are then executed by processor 1507 to load other computer programs and portions of computer programs into system memory from non-volatile storage. The present invention may be embodied in a sequence of instructions which can be stored in a computer-readable medium and executed by processor 1507. It will be appreciated that both system memory and non-volatile storage may be used to effectuate a virtual memory. In that case, sequences of instructions defining a portion of the operating system or an application program may be kept in non-volatile storage and then moved to system memory when required for execution.

Having described a method for practicing the present invention, it should be noted that the individual steps therein may be performed by a general purpose processor programmed with instructions that cause the processor to perform the recited steps, specific hardware components that contain hard-wired logic for performing the recited steps, or any combination of programmed general purpose computer components and custom hardware components. Nothing disclosed herein should be construed as limiting the present invention to a single embodiment wherein the recited steps are performed by a specific combination of hardware components.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly to be regarded in an illustrative rather than a restrictive sense.

What is claimed is:

1. A method for managing termination of a process that holds a resource lock on behalf of another process, said method comprising the steps of:

a first process acquiring a first lock to a resource on behalf of a second process, the first lock signaling exclusive access to the resource;

the second process acquiring a wait lock to the resource;

a third process acquiring the first lock to the resource;

the third process determining that the first process terminated without releasing the first lock; and the third process acquiring the wait lock to prevent concurrent access to the resource by the third process and the second process.

2. The method of claim 1 wherein said step of the second process acquiring a wait lock to the resource comprises the step of the second process acquiring the wait lock in an exclusive-mode.

3. The method of claim 1 wherein said step of a first process acquiring a first lock to a resource on behalf of a second process comprises the step of the first process storing a value identifying the first process in a storage location associated with the first lock.

4. The method of claim 3 wherein said step of the third process determining that the first process terminated without releasing the first lock comprises the step of the third process examining the value stored in the storage location associated with the first lock.

5. The method of claim 3 wherein said step of the third process determining that the first process terminated without releasing the first lock comprises the step of the third process determining that the value stored in the storage location associated with the first lock is not equal to a predefined value.

6. The method of claim 3 wherein said step of the first process storing a value identifying the first process in a storage location associated with the first lock comprises the step of storing the value identifying the first process in an attribute of a data object representing the first lock.

7. The method of claim 1 further comprising the steps of:

the second process acquiring the first lock in a mode compatible with a mode in which the first process acquired the first lock;

the second process determining whether a value associated with the first lock identifies the first process; and the second process releasing the first lock and the wait lock if the value associated with the first lock does not identify the first process.

8. The method of claim 7 further comprising the step of the second process terminating after releasing the first lock and the wait lock.

9. The method of claim 7 further comprising the steps of:

detecting that the first process terminated without releasing the first lock; and releasing the first lock on behalf of the first process.

10. The method of claim 9 further comprising the step of restoring the value associated with the first lock to a predefined value if the second process has not acquired the first lock in the mode compatible with the mode in which the first process acquired the first lock.

11. The method of claim 7 wherein said step of the second process acquiring the first lock in a mode compatible with a mode in which the first process acquired the first lock comprises the step of the second process acquiring the first lock in a null-mode.

12. A computer-readable medium having a plurality of sequences of instructions stored thereon which, when executed by one or more processors, cause said one or more processors to manage termination of a process that holds a resource lock on behalf of another process, said plurality of sequences of instructions including sequences of instructions which, when executed by said one or more processors, cause said one or more processors to perform the steps of:

executing a first process to acquire a first lock to a resource on behalf of a second process, the first lock signaling exclusive access to the resource;

executing the second process to acquire a wait lock to the resource;

executing a third process to acquire the first lock to the resource;

executing the third process to determine that the first process terminated without releasing the first lock; and executing the third process to attempt to acquire the wait lock, preventing concurrent access to the resource by the third process and the second process.

13. The computer-readable medium of claim 12 wherein said step of executing a first process to acquire a first lock to a resource on behalf of a second process comprises the step of executing the first process to store a value identifying the first process in a storage location associated with the first lock.

14. The computer-readable medium of claim 13 wherein said step of executing the third process to determine that the first process terminated without releasing the first lock comprises the step of executing the third process to determine that the value stored in the storage location associated with the first lock is not equal to a predefined value.

15. The computer-readable medium of claim 12 wherein said plurality of sequences of instructions further include sequences of instructions which, when executed by said one or more processors, cause said one or more processors to execute the second process to perform the steps of:

acquiring the first lock in a mode compatible with a mode in which the first process acquired the first lock;

determining whether a value associated with the first lock identifies the first process; and releasing the first lock and the wait lock if the value associated with the first lock does not identify the first process.

16. The computer-readable medium of claim 15 further comprising the step of terminating the second process after releasing the first lock and the wait lock.

17. A computer data signal embodied in a carrier wave and encoding a plurality of sequences of instructions which, when executed by one or more processors, cause said one or more processors to manage termination of a process that holds a resource lock on behalf of another process, said plurality of sequences of instructions including sequences of instructions which, when executed by said one or more processors, cause said one or more processors to perform the steps of:

executing a first process to acquire a first lock to a resource on behalf of a second process, the first lock signaling exclusive access to the resource;

executing the second process to acquire a wait lock to the resource;

executing a third process to acquire the first lock to the resource;

executing the third process to determine that the first process terminated without releasing the first lock; and executing the third process to acquire the wait lock, acquisition of the wait lock preventing concurrent access to the resource by the third process and the second process.

18. The computer data signal of claim 17 wherein said step of executing a first process to acquire a first lock to a resource on behalf of a second process comprises the step of executing the first process to store a value identifying the first process in a storage location associated with the first lock.

19. The computer data signal of claim 18 wherein said step of executing the third process to determine that the first process terminated without releasing the first lock comprises the step of executing the third process to determine that the value stored in the storage location associated with the first lock is not equal to a predefined value.

20. A method for managing termination of a process that holds a resource lock on behalf of another process, said method comprising the steps of:

a first process acquiring a first lock to a resource in an exclusive-mode on behalf of a second process, the first lock signaling exclusive access to the resource;

the first process storing a value identifying the first process in a storage location associated with the first lock;

the second process acquiring a wait lock to the resource;

the second process acquiring the first lock in a mode compatible with the exclusive mode in which the first process acquired the first lock;

the second process releasing the first lock and the wait lock if a value associated with the first lock does not identify the first process;

a third process acquiring the first lock to the resource;

the third process examining the value stored in the storage location associated with the first lock to determine if the first process terminated without releasing the first lock; and the third process acquiring the wait lock to prevent concurrent access to the resource by the third process and the second process if the value stored in the storage location associated with the first lock indicates that the first process terminated without releasing the first lock.

* * * * *